United States Patent

Rubin

[15] 3,689,098
[45] Sept. 5, 1972

[54] MERCHANDISE DELIVERY CART WITH MEANS FOR COMPACTLY STORING DEMOUNTABLE LIKE CARTS

[72] Inventor: Richard J. Rubin, 39 Dolphin Road, Newton, Mass. 02159

[22] Filed: May 20, 1971

[21] Appl. No.: 145,350

Related U.S. Application Data

[63] Continuation-in-part of Ser. No. 858,342, Sept. 16, 1969, Pat. No. 3,608,920.

[52] U.S. Cl. ........ 280/33.99 T, 280/179 R, 280/79.1
[51] Int. Cl. .......................... B62d 39/00, B60d 1/00
[58] Field of Search ..... 280/33.99 R, 33.99 T, 179 R, 280/79.1; 5/8

[56] References Cited

UNITED STATES PATENTS

| | | |
|---|---|---|
| 2,712,452 | 7/1955 | Hallowell et al. ......... 280/79.1 |
| 2,756,894 | 7/1956 | Phillips ......... 280/33.99 T UX |
| 3,173,708 | 3/1965 | Machielse et al. ...... 280/179 R |
| 3,572,764 | 3/1971 | Rubin .................... 280/491 A |
| 3,608,920 | 9/1971 | Rubin .................. 280/33.99 T |

*Primary Examiner*—Leo Friaglia
*Attorney*—Robert L. Thompson

[57] ABSTRACT

A merchandise delivery cart having a horizontal wheeled platform and detachable vertical end members. Mounting means is provided on the platform for detachably supporting in a vertical position approximately eight additional end members for storage purposes. Also, approximately four additional platforms are stood vertically on end on the platform for storage purposes.

17 Claims, 9 Drawing Figures

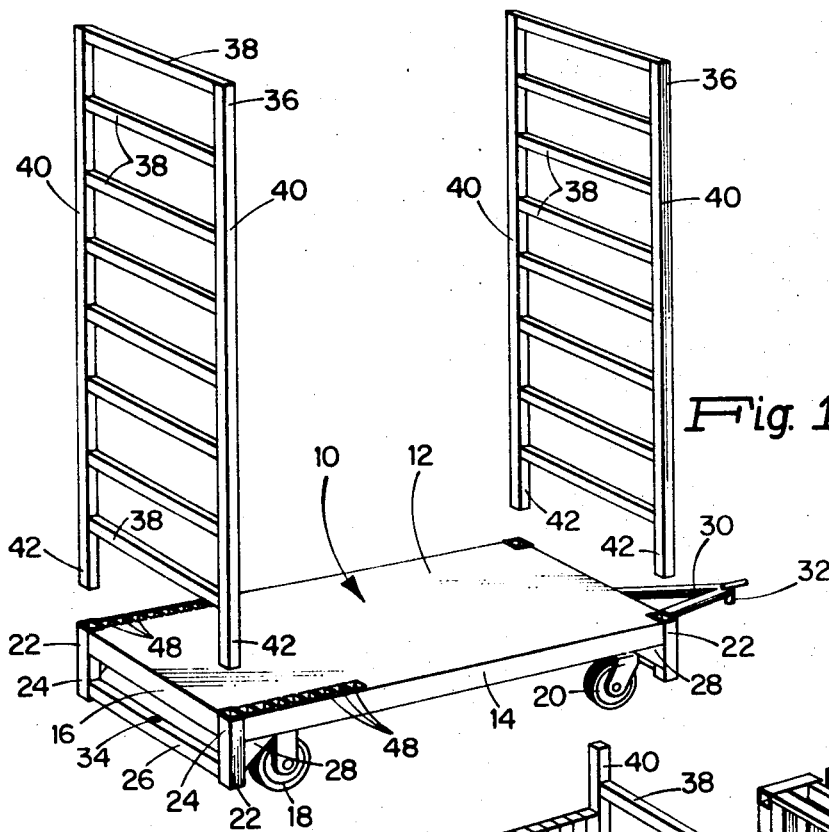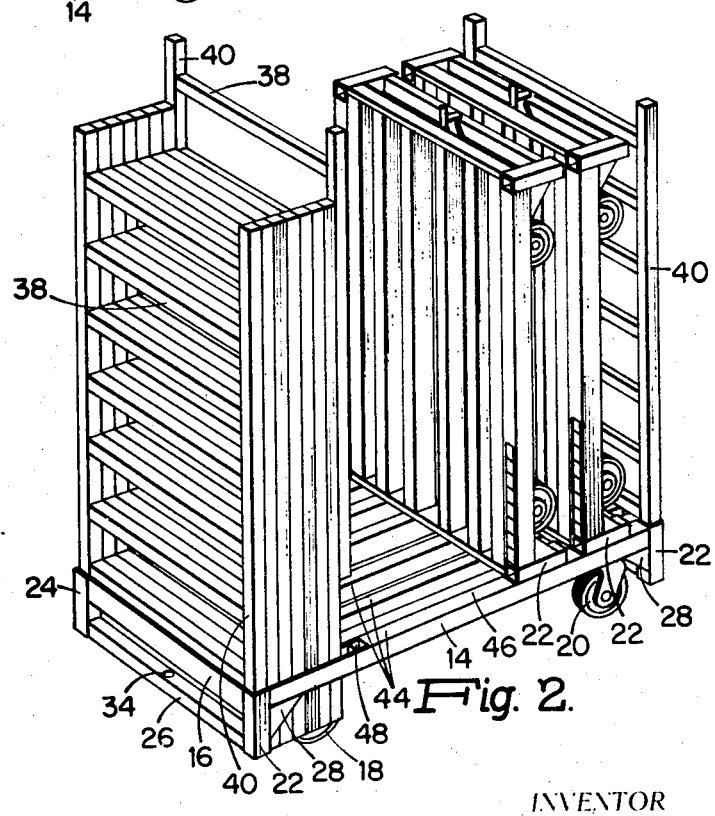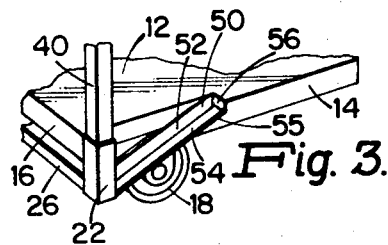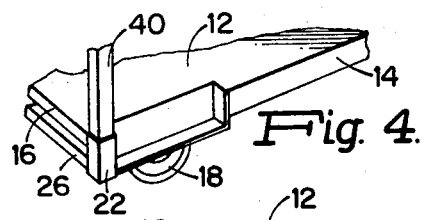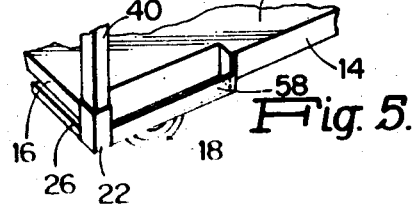

INVENTOR.
RICHARD J. RUBIN

MERCHANDISE DELIVERY CART WITH MEANS FOR COMPACTLY STORING DEMOUNTABLE LIKE CARTS

CROSS-REFERENCES TO RELATES APPLICATIONS

This application is a continuation-in-part of my earlier application, Ser. No. 858,342 filed Sept. 16, 1969, now U.S. Pat. No. 3,608,920.

BACKGROUND OF THE INVENTION

This invention relates to wheeled carts for carrying merchandise. These carts have a horizontal platform and two detachable vertical end members to confine the merchandise on the carts.

A typical use for these carts is to transport merchandise from a warehouse to a retail store. In this use, a number of carts are loaded at the warehouse with merchandise and the carts are wheeled into a trailer or other large truck for transport to the retail store. At the store, the carts are wheeled out of the truck and pushed by hand or towed by small truck to the department needing the merchandise. After the merchandise has been unloaded, the empty carts are then returned to the shipping and receiving area where they remain until they are shipped back to the warehouse in the next trailer truck which makes a warehouse to retail store delivery.

The problem this invention solves is the large amount of floor space required by the empty carts while they stand idle either at the retail store, at the warehouse or on the truck during return shipment to the warehouse. Of course, more generally, the problem is the floor space required by the empty carts anywhere which adds considerably to building and transportation expenses.

Another problem is the secure storage of the cart end members. In the past, these have had a tendency to slip sideways off the platform. This lateral shifting caused end members to hang over the side of the cart and to strike or catch on passing objects. The results of such occurrences can be quite dangerous and cause considerable damage.

Accordingly, it is an object of this invention to provide a merchandise delivery cart which can be quickly and easily disassembled so that four disassembled carts may be stored on one assembled cart thereby lowering floor space requirements by 80 percent.

Another object of this invention is to provide means incorporated into the cart members to facilitate storage of disassembled carts, said means providing a secure yet simple storage engagement designed specifically to prevent the accidental shifting of the cart end members.

Another object of this invention is to provide a cart which can be disassembled and stored on another cart without the use of bolts, straps or any other fastening means.

Further objects and advantages of this invention will become apparent from the following description and drawings.

SUMMARY OF THE INVENTION

This invention is a wheeled cart having a flat platform and removable upstanding end members. The platform of the cart has mounting means into which the disassembled end members of four other carts are inserted for vertical storage. The disassembled platforms of the four other carts are positioned vertically on the platform of the assembled cart and are self-supporting.

This invention has a preferred embodiment wherein the platform mounting means is in the form of hollow sockets located on the platform side margins. Alternative embodiments include platform mounting means in the form of upstanding studs, platform slots and U-shaped or L-shaped channels. A still further embodiment utilizes the platform surfaces themselves as a mounting means wherein the platform upper surface and sides cooperate to support the end members.

BRIEF DESCRIPTION OF THE DRAWINGS

FIG. 1 is a perspective view of the preferred embodiment of the merchandise cart of this invention. In this view, the end members are shown detached, the platform is solid and the platform mounting means is a plurality of hollow sockets;

FIG. 2 is a perspective view of the cart shown in FIG. 1 with the end members shown inserted in their end mounts and a number of detached end members and platforms stored on the platform. In this view, the platform is longitudinally slotted to reduce weight;

FIG. 3 is a perspective view of a portion of the cart showing an alternative platform mounting means for receiving the end members in sloped L-shaped channels;

FIG. 4 is a perspective view of a portion of the cart showing another alternative platform mounting means for receiving the end members in level L-shaped channels;

FIG. 5 is a perspective view of a portion of the cart showing still another alternative platform mounting means for receiving the end members in U-shaped channels;

DESCRIPTION OF THE PREFERRED EMBODIMENTS

Figure 6:
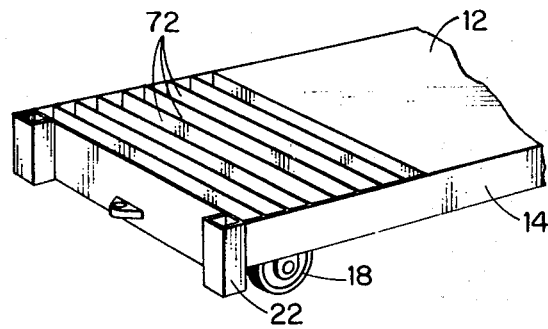
FIG. 6 is a perspective view of a portion the cart showing still another alternative platform mounting means for receiving the end members in slots running across the width of the cart.

Referring to FIG. 1, the merchandise cart of this invention has a rectangular horizontal platform 10 which has a flat upper merchandise supporting surface 12. Platform 10 has vertical sides 14 and ends 16 fixed to and extending downwardly from the margins of surface 12 and four wheels mounted on its underside. Preferably, there are two fixed wheels 18 and two pivoted wheels 20.

At each of the four corners of platform 10, an end member supporting mount 22 is fixed in a vertical orientation. Preferably, each mount 22 is formed of rectangular, open-ended, hollow tubing and has a flat end surface 24. As shown in FIG. 1, end mounts 22 have their upper open ends flush with the platform upper surface 12 and extend downwardly therefrom. The lower portions of end mounts 22 are laterally braced by cross members 26 and longitudinally braced by triangular members 28.

A towing hitch 30 extends from the front end of platform 10 and is retractable when not needed. Hitch 30 has a vertical towing pin 32 adapted for engagement in a vertical aperture. Cross member 26 has a vertical aperture 34 formed therein sized to pivotally accommodate towing pin 32 if it is desired to form a train of carts.

In order to restrain the merchandise against endwise displacement on the upper surface 12 of the platform 10, two ladder-like end members 36 are provided. These end members are preferably fabricated from hollow square tubing wherein a number of spaced-apart horizontal spans 38 are welded to two vertical side rails 40. At the lower ends of end members 36, mounting means are provided comprising extension elements 42 which are sized and shaped to fit into the hollow sockets of end member supporting mounts 22. As can be seen in FIG. 2, the end members drop into open bottomed mounts 22 until the lowermost end member span 38 bears against upper surface 12 of the platform. Optionally, the mounts 22 could have closed bottoms and the extension elements 42 of side rails 40 could seat thereon.

FIG. 1 shows a platform 10 which has a flat, solid upper surface 12. FIG. 2 shows a platform 10 which is constructed from spaced-apart tubular elements 44 which are welded to the ends 16. The flat tops of the tubular elements 44 form the upper merchandise supporting surface 46. For some uses, the open platform of FIG. 2 is preferred over the solid platform of FIG. 1 especially where the weight of the cart is an important factor.

In order to store the four disassembled carts in the single assembled cart, it is necessary to provide a platform mounting means to engage with the end member mounting means. Previously, this was done by strapping the detached end members to one mounted end member, as shown in applicant's U.S. Pat. No. D-218,558, but this procedure permitted unwanted detached end member slippage on the cart platform, both laterally and longitudinally. Therefore, this invention includes providing mounting means on the detached end members 36 and providing complementary mounting means on the platform 10 for supporting the detached end members which are stored on the platform and for restraining them from substantial displacement in any direction.

In the preferred embodiment shown in FIGS. 1 and 2, the end member mounting means is the extension elements 42. The platform mounting means is the hollow sockets 48 which are provided in the upper surface 12 of platform 10 and extend downwardly therefrom. Hollow sockets 48 have the same square cross-section as the extension elements 42 and are slightly larger in size. As can be seen in FIG. 2, extension elements 42 are easily insertable into hollow sockets 48 and the sockets have sufficient depth to provide firm support to prevent the detached end members from tipping. Hollow sockets 48 optionally have open or closed ends. Preferably, the sockets are located on the side margins of platform upper supporting surface 12 and are 16 in number, eight on each side to accommodate four carts for storage.

The four detached platforms 10 are stored on the empty cart in the manner shown in FIG. 2 which is the same manner as that shown in my previously mentioned patent. That is, the platforms are stood vertically on end so that the end surfaces 24 of two end member mounts 22 as well as end 16 and cross member 26 all bear against upper surface 12 of the platform. The weight of the platform prevents its shifting on the platform upper surface 12.

It will now be appreciated that four carts having the preferred embodiment of this invention may be disassembled and stored upon an empty cart by (a) detaching the eight end members 36 and inserting their extension elements 42 vertically into the platform sockets 48 of the empty cart and (b) placing the four detached platforms 10 vertically on the empty cart's platform upper surface 12. Thus, five empty carts now require the floor space of but one cart.

Having just described the preferred embodiment of this invention, several alternate platform mounting means shall now be discussed. These alternate means are shown in FIG. 3–9 of the drawings.

FIG. 3 shows the platform 10 having a notch cut therein adjacent the end member mount 22. There are two of these notches in each platform 10 which are positioned in approximately the same location as that of the hollow sockets 48 shown in FIG. 1. Mounted in each notch is a support member comprising an L-shaped channel 50 having an inner wall 52, and a bottom wall 54 joined at right angles to inner wall 52. A forward vertical wall 56 and the forward surface of end member mount 22 form the ends of the L-shaped channel 50. The L-shaped channel 50 is sloped downwardly toward and fixed at its lower end to end member mount 22 and at its upper end to the platform. The outer edge 55 of the bottom wall 54 is flush with side wall 14 of the platform 10. End members 36 are stored in the L-shaped support members 50 in the same fashion as shown in FIGS. 1–2 except that if less than eight end members are stored in the L-shaped channels, the end members are tilted back against the mounted end member 36 in a stack and are held there by the force of gravity. If eight end members are stored in the channels, the channel end walls hold them vertically. In virtually every other respect, the description of the preferred embodiment applies equally to that of FIG. 3.

FIG. 4 shows platform 10 having notches cut therein similar to the embodiment of FIG. 3. Here again, L-shaped channels are provided, each having an inner wall, a bottom wall at right angles thereto, and vertical end walls provided either by separate wall elements or by the platform notch and end member mount surfaces. The insertion of the eight end members and their vertical containment in the channels is the same as that of the FIG. 3 embodiment, as is their backward tilting against the mounted end member 36 in the event that less than eight detached end members are stored in the channels. The bottom wall edge of the FIG. 4 channel is flush with platform side wall 14.

FIG. 5 shows an embodiment identical to that of FIG. 4 except that an outer wall 58 extends upwardly from and at right angles to the bottom wall to form a U-shaped channel. Outer wall 58 is flush with platform side wall 14.

Figure 8:
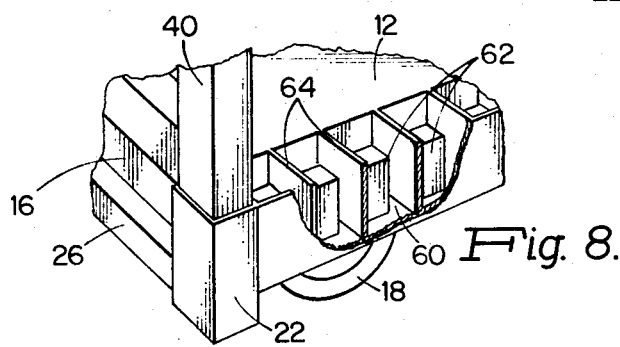
FIG. 8 is a perspective view of a portion of the cart showing still another alternative platform mounting means for receiving the end members on square upstanding studs.
Figure 9:
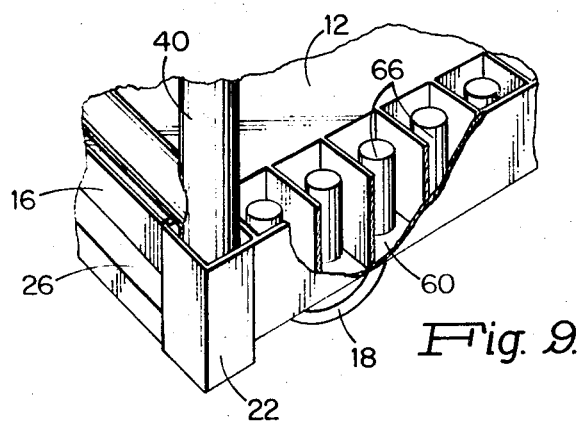
FIG. 9 is a perspective view of a portion of the cart showing still another alternative platform mounting means for receiving the end members on round upstanding studs.

FIG. 8 shows an embodiment similar to FIGS. 1-2 except that the hollow sockets 48 have a solid bottom wall and finger elements mounted thereon and extending upwardly therefrom in the form of studs 62. The purpose of these studs is to receive the hollow end member extension elements 42 and to hold the end members 36 vertically. Obviously, if studs 62 are provided, the socket walls 64 are not entirely necessary. FIG. 9 is identical to FIG. 8 except that studs 66 are cylindrical. The FIG. 9 embodiment is used in conjunction with cylindrical extension elements 42. The studs of FIGS. 8-9 show that this invention operates equally well without regard to whether the extension elements 42 act as solid fingers inserted into hollow sockets or as hollow sockets inserted onto solid fingers. Also, although in the preferred construction the platform mounting means extends downwardly from upper surface 12 of platform 10, the platform mounting means could also function if located above, on or below upper surface 12. However, the shown construction has proven most satisfactory in use.

Figure 7:
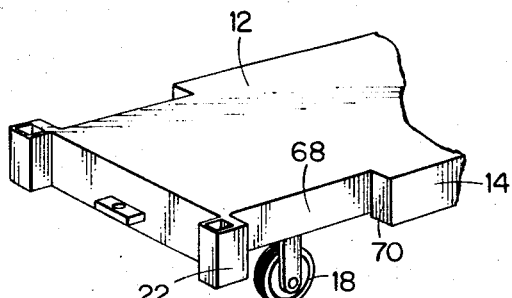
FIG. 7 is a perspective view of a portion of the cart showing still another alternative platform mounting means for receiving the end members on the upper and side surfaces of the cart itself.

FIG. 7 shows an embodiment identical to FIGS. 4-5 except that the channels have been entirely omitted from the notches. It will be seen that the platform 10 itself forms a platform mounting means wherein upper surface 12 is adapted to support the lowermost end member span 38 and the inner side surfaces 68 are adapted to support the extension elements 42. The front surface of end member mount 22 and the rear notch surface 70 form the end walls for the slots or notches. If eight end members are stored in these notches, they will be held vertically by the end walls. If less than eight members are stored, they are tilted rearwardly against the end member 36 which is fixed in mounts 22. Although less desirable, the FIG. 7 embodiment alternatively could omit the notches completely and size the end members to span the entire width of platform 10. Then, the end members would be stored by simply straddling them over the rectangular platform 10.

In the embodiments of FIGS. 1-5 and 7-9, the end member mounting means comprises extension elements 42. In FIG. 6, a slightly different concept is shown. FIG. 6 provides eight slots 72 extending across the width of platform 10. Preferably, these slots are fabricated from U-shaped channels although other shapes could be combined to produce the same slot configuration. Slots 72 are especially shaped to accept the upper ends of end members 36 which have a span 38 welded to the upper tips of side rails 40. FIG. 1 shows such an end member. Of course, slots 72 will also accept the extension elements 42 of the end members shown in FIG. 2. In the FIG. 6 embodiment, if the end member upper ends are inserted into the slots 72, the upper ends comprise the end member mounting means.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. In a merchandise delivery cart having a substantially rectangular horizontal platform including an upper merchandise supporting surface; wheels mounted on the underside of the platform for providing mobility thereto; end member supporting mounts fixed to the platform; and a pair of end members detachably supported by the end member mounts in a vertical orientation at the front and rear ends of the horizontal platform; improved means for storing additional end members between the supportably mounted end members and substantially parallel thereto, said improved storage means comprising:
   a. the end members having mounting means incorporated therein; and
   b. the platform having complementary mounting means incorporated therein adapted to detachably support the additional end members and to restrain them from substantial displacement in any direction.

2. The cart of claim 1 wherein said platform mounting means comprises hollow sockets and said end member mounting means comprises extension elements shaped and sized to fit into said hollow sockets.

3. The cart of claim 2 wherein said hollow sockets are located on the horizontal platform and extend downwardly from the merchandise supporting surface.

4. The cart of claim 2 wherein said hollow sockets are located on the side margins of the upper supporting surface.

5. The cart of claim 4 wherein said hollow sockets extend downwardly from the upper supporting surface.

6. The cart of claim 2 wherein said hollow sockets have open bottoms.

7. The cart of claim 2 wherein said hollow sockets have closed bottoms.

8. The cart of claim 1 wherein said platform mounting means comprises finger elements and said end member mounting means comprises finger-engageable elements shaped and sized to accommodate said finger elements.

9. The cart of claim 8 wherein said finger means comprise upstanding studs and said finger-engageable elements comprise hollow end member extension elements.

10. The cart of claim 1 wherein said platform mounting means comprises said platform upper supporting surface having slots formed therein shaped and sized to accommodate said end member mounting means.

11. The cart of claim 10 wherein said supporting surface slots are disposed along the length of the cart.

12. The cart of claim 10 wherein said supporting surface slots are disposed across the width of the cart.

13. The cart of claim 1 wherein said platform mounting means comprises support members affixed to the platform, each said support member having walls for supporting the end member mounting means against horizontal movement and against downward movement.

14. The cart of claim 13 wherein said support members are located on the side margin of the platform and extend along the length of the cart.

15. The cart of claim 13 wherein said support members extend across the width of the cart.

16. The cart of claim 14 wherein said support members are L shaped in elevation cross-section.

17. The cart of claim 1 wherein said platform mounting means comprises the platform upper supporting surface and the sides of the platform and said end member mounting means comprises the lower portions of the end members which are shaped and sized to fit over and be restrained by the platform upper supporting surface and the sides of the platform.

* * * * *